3,023,246
PRODUCTION OF BRANCHED UNSATURATED KETONES
Heinrich Pasedach, Ludwigshafen (Rhine), and Matthias Seefelder, Ludwigshafen (Rhine)-Oppau, Germany, assignors to Badische Anilin- & Soda-Fabrik Aktiengesellschaft, Ludwigshafen (Rhine), Germany
No Drawing. Filed Nov. 23, 1956, Ser. No. 623,813
Claims priority, application Germany Dec. 10, 1955
5 Claims. (Cl. 260—595)

This invention relates to a process for the production of branched unsaturated ketones, in particular a process for the production of gamma.delta-unsaturated ketones, which have a branching in the delta-position.

It is known to prepare unsaturated ketones which contain the double linkage in gamma.delta-position by way of the acetoacetic esters of beta.gamma-unsaturated alcohols by thermal treatment.

These acetoacetic esters are obtained in the first stage of the process by transesterification of acetoacetic methyl or ethyl esters with the beta.gamma-unsaturated alcohols or by adding on the same to diketene (J. Am. Soc. 65, 1943).

Gamma.delta-unsaturated ketones are also accessible from acetoacetic ethyl ester and higher unsaturated alcohols, for example linalool and geraniol, by heating these at 200° to 220° C. for a long period (Carroll, J. Chem. Soc. 507, 1941).

The lower unsaturated alcohols, of which the boiling point lies below about 160° C., could not hitherto be reacted direct with acetoacetic esters to form unsaturated ketones. They had to be obtained in very bad yields by the two above-mentioned troublesome methods.

In the case of the tertiary alcohols of which the boiling point lies below 140° C., the method of transesterification is also inoperative. For example a mixture of acetoacetic ester and 2-methylbutene-(3)-ol-(2) can be boiled under reflux for several days without the desired reaction taking place.

Recently it has become known that lower unsaturated alcohols, as for example allyl or crotyl alcohol, can also be directly converted with acetoacetic ester into the corresponding unsaturated ketones, such as allyl acetone and 3-methylhexene-(1)-one-(5), by heating them to temperatures of 300° to 600° C. according to British Patent No. 695,313.

This reaction, however, is only accessible for primary and secondary beta.gamma-unsaturated alcohols because the tertiary beta.gamma-unsaturated alcohols under these conditions are extensively converted into diolefines by the splitting off of water. For example isoprene and water form under these conditions from 2-methylbutene-(3)-ol-(2).

We have now found that tertiary beta.gamma-olefinically unsaturated alcohols of which the boiling point lies below 140° C. can also be converted in a simple way into gamma.delta-unsaturated ketones which are branched in the delta-position by reacting them in the liquid phase with lower alkyl esters of acetoacetic acid at temperatures below 250° C., advantageously at 160° to 200° C.

By lower alkyl esters of acetoacetic acid we mean those which are derived from monoalcohols having 1 to 5 carbon atoms, before all from methanol and ethanol.

Suitable tertiary unsaturated alcohols are for example monohydric alcohols having 5 to 7 carbon atoms of the general formula

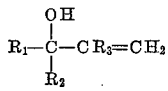

in which $R_1$ and $R_2$ represent methyl and ethyl radicals and $R_3$ methyl and ethyl radicals and also hydrogen.

To carry out the reaction, the unsaturated alcohol can be introduced into liquid acetoacetic acid ester heated to 170° to 180° C. or into a solution of acetoacetic ester in an inert solvent which similarly is heated to 170° to 190° C., the components of low boiling point being continuously distilled off. Alternatively the solvent heated to 170° to 190° C. may be contained in a suitable vessel and a mixture of the acetoacetic ester with the unsaturated olefinic alcohol led into the same. Also in this case, all the low-boiling constituents are continually distilled off. These in the case of ethyl acetoacetate are ethyl alcohol and the low-boiling tertiary unsaturated alcohol which has not entered into reaction. The reaction temperature should not exceed 160° C.

Inert solvents are for example those which are not attacked under the reaction conditions either by the reactants or by heat, for example tetrahydronaphthalene, decahydronaphthalene, naphthalene and diphenyl ether.

It is preferable to use a solvent which boils above 160° C. and can readily be separated by distillation from the unsaturated ketone formed.

To attain good yields it is preferable to use the unsaturated alcohol in excess, for example in the molar ratio of 2:1.

The unsaturated ketone can be recovered by fractional distillation after the reaction is ended, the end of the reaction being recognizable by the cessation of the disengagement of gas.

By this method, which can also be carried out under increased pressure, the unsaturated ketones are obtained in a simple way in one reaction stage in good yields.

A further advantage lies in the fact that working with a strongly irritant diketene which is less stable in storage is avoided.

The ketones accessible by the method according to this invention are valuable intermediate products, especially for the production of linalool, geraniol, citral, violet perfumes and in the synthesis of vitamin-A.

The following examples will further illustrate this invention but the invention is not restricted to these examples. The parts specified in the examples are parts by weight.

Example 1

650 parts of ethyl acetoacetate are heated to 170° C. in a stirring vessel with superposed distillation column and in the course of 6 hours 860 parts of 2-methylbutene-(3)-ol-(2) are introduced through a pipe reaching to the bottom of the stirring vessel.

At the head of the distillation column there are thereby obtained 772 parts of distillate of the boiling point 75° to 90° C., which contains mainly ethyl alcohol and methyl butenol.

The carbon dioxide formed by the reaction is also removed at the top of the column.

When all has been added, the reaction mixture is further heated for an hour and then fractionally distilled.

380 parts of 2-methylheptene-(2)-one-(6) of the boiling point 173° to 174° C. and 60 parts of unreacted acetoacetic ester and 25 parts of dehydracetic acid are obtained.

The yield amounts to 66% with reference to the reacted acetoacetic ester.

Example 2

In the vessel described in Example 1, 1000 parts of tetrahydronaphthalene are heated to 175° C. and then 390 parts of ethyl acetoacetate are introduced at once. Into this mixture there are introduced in the course of 3 hours 516 parts of 2-methylbutene-(3)-ol-(2). During the same time 460 parts of ethyl alcohol and methyl butenol are distilled off.

272 parts of 2-methylheptene-(2)-one-(6) and 38 parts of unreacted acetoacetic ester are obtained. The yield is 80% with reference to the reacted acetoacetic ester.

*Example 3*

1000 parts of tetrahydronaphthalene are heated, as described in Example 1, to 175° C. and thereupon a mixture of 390 parts of ethyl acetoacetate and 516 parts of 2-methylbutene-(3)-ol-(2) is introduced in the course of 6 hours. During the distillation 453 parts of ethyl alcohol and methyl butenol are recovered, and by fractional distillation 222 parts of 2-methylheptene-(2)-one-(6) and 25 parts of acetoacetic ester are obtained.

The yield amounted to 63% with reference to reacted acetoacetic ester.

*Example 4*

1000 parts of diphenyl ether are heated to 175° C. as described in Example 1 and thereupon a mixture of 390 parts of ethyl acetoacetate and 516 parts of 2-methylbutene-(3)-ol-(2) is introduced in the course of 6 hours. By distilling off, 453 parts of ethyl alcohol and methyl butenol are recovered and by fractional distillation 222 parts of 2-methylheptene-(2)-one-(6) and 25 parts of acetoacetic acid ester are obtained.

The yield amounts to 63% with reference to the reacted acetoacetic ester.

*Example 5*

1000 parts of diphenyl ether are heated to 170° C. and at 170° to 180° C. a mixture of 160 parts of 3-methylpentene-(4)-(ol-(3) and 115 parts of ethyl acetoacetate is introduced in the course of 4 hours.

A distillate of 44 parts of ethyl alcohol and methyl pentenol and, by further fractionation, a further 60 parts of methyl pentenol and 76 parts of 3-methyloctene-(3)-one-(7) of the boiling point 91° to 92° C. at 18 torr. are obtained.

The compound gives a semicarbazone of the melting point 113° C.

What we claim is:

1. A process for the production of branched, olefinically-unsaturated ketones which comprises adding a beta, gamma-olefinically unsaturated, tertiary alcohol which boils below 140° C., said alcohol having 5–7 carbons and being of the formula

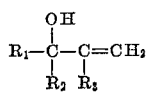

wherein $R_1$ and $R_2$ are selected from the group consisting of methyl and ethyl and $R_3$ is selected from the group consisting of hydrogen, methyl and ethyl, the total carbons in $R_1$, $R_2$ and $R_3$ being at least 2 and not more than 4, in small quantities to a reaction zone maintained at 160–250° C. and containing a lower alkyl ester of acetoacetic acid, the alkyl group of which has 1–5 carbons, reacting said alcohol and said ester in the liquid phase at 160° C. to 250° C., thereby producing carbon dioxide, a branched olefinically-unsaturated ketone, and a lower alkanol corresponding with the alcohol portion of said ester and distilling off the low boiling components from the reaction mixture during the reaction.

2. A process for the production of 2-methylheptene-(2)-one-(6) which comprises adding 2-methylbutene-(3)-ol-(2) in small increments to a reaction zone maintained at 160–200° C. and containing a lower alkyl ester of acetoacetic acid, the alkyl group of which has 1–5 carbons, reacting in the liquid phase said 2-methylbutene-(3)-ol-(2) and said ester of 160–200° C., thereby producing carbon dioxide, 2-methylheptene-(2)-one-(6), and a lower alkanol corresponding with the alcohol portion of said ester, and distilling off the low boiling components from the reaction mixture during the reaction, said low boiling components including said alkanol and unreacted 2-methylbutene-(3)-ol-(2).

3. The process of claim 1 wherein said olefinically-unsaturated alcohol and said ester of acetoacetic acid both are added slowly to a body of an inert liquid solvent in said reaction zone maintained at 160–250° C.

4. The proces of claim 1 wherein said olefinically-unsaturated alcohol is added slowly to a liquid body of said acetoacetic acid ester in said reaction zone maintained at 160–250° C.

5. The process of claim 1 wherein said olefinically-unsaturated alcohol is added slowly to a liquid body of said acetoacetic acid ester in an inert liquid solvent in said reaction zone maintained at 160–250° C.

References Cited in the file of this patent

UNITED STATES PATENTS 2,766,289    Lacey                  Oct. 9, 1956

FOREIGN PATENTS 646,962    Great Britain         Nov. 29, 1950

OTHER REFERENCES

Carroll: J. Chem. Soc. (London), 1941, pp. 507–11.